(12) United States Patent
Böhm et al.

(10) Patent No.: US 9,834,425 B2
(45) Date of Patent: Dec. 5, 2017

(54) EXHAUST LINE ASSEMBLY FOR A BOTTLE ATTACHMENT APPARATUS

(71) Applicant: BRAND GMBH + CO KG, Wertheim (DE)

(72) Inventors: Dieter Böhm, Wertheim (DE); Michael Ertl, Marktheidenfeld (DE)

(73) Assignee: BRAND GMBH + CO KG, Wertheim (DE)

( * ) Notice: Subject to any disclaimer, the term of this patent is extended or adjusted under 35 U.S.C. 154(b) by 0 days.

(21) Appl. No.: 15/002,788

(22) Filed: Jan. 21, 2016

(65) Prior Publication Data

US 2016/0214847 A1    Jul. 28, 2016

(30) Foreign Application Priority Data

Jan. 23, 2015  (DE) .................. 20 2015 000 519 U (51) Int. Cl.
| | |
|---|---|
| *B67C 3/26* | (2006.01) |
| *B05B 11/00* | (2006.01) |
| *G01F 11/02* | (2006.01) |
| *B67C 3/28* | (2006.01) |
| *B01L 3/02* | (2006.01) |

(52) U.S. Cl.
CPC .......... *B67C 3/2634* (2013.01); *B01L 3/0293* (2013.01); *B05B 11/0032* (2013.01); *B67C 3/28* (2013.01); *G01F 11/028* (2013.01); *B01L 2400/0478* (2013.01); *B01L 2400/0605* (2013.01); *B05B 11/3007* (2013.01); *B05B 11/3015* (2013.01)

(58) Field of Classification Search
CPC ..... B01L 2400/0478; B01L 2400/0605; B01L 3/0293; B05B 11/0032; B05B 11/3007; B05B 11/3015; B67C 3/2634; B67C 3/28
See application file for complete search history.

(56) References Cited

U.S. PATENT DOCUMENTS

| | | | |
|---|---|---|---|
| 3,729,022 A | 4/1973 | Roach | |
| 3,940,027 A | 2/1976 | Marterer | |
| 4,074,831 A * | 2/1978 | Roach | ................. B05B 11/3007 |
| | | | 222/309 |

(Continued)

FOREIGN PATENT DOCUMENTS

| | | |
|---|---|---|
| DE | 1 632 032 A1 | 8/1970 |
| DE | 26 33 723 A1 | 2/1977 |

(Continued)

OTHER PUBLICATIONS

Brand General Catalog 900 (Jun. 2013), pp. 334-341.

*Primary Examiner* — Frederick C Nicolas
*Assistant Examiner* — Bob Zadeh
(74) *Attorney, Agent, or Firm* — David S. Safran (57) ABSTRACT

An exhaust line assembly for a bottle attachment apparatus for handling liquids has an outrigger-type mount, an exhaust line which is disposed and guided in the mount and which terminates in a tip, and a mounting lug which has a closure cap attached to the end thereof and which is fastened to the exhaust line assembly, the tip of the exhaust line being closable by way of the closure cap. The mounting lug at that end thereof which is fastened to the exhaust line assembly is articulated so as to be pivotable by a rotary joint which has a physically present axis of rotation.

29 Claims, 6 Drawing Sheets

(56) References Cited

U.S. PATENT DOCUMENTS

| | | | |
|---|---|---|---|
| 4,273,257 A | 6/1981 | Smith et al. | |
| 4,306,670 A | 12/1981 | Oshikubo | |
| 4,429,904 A | 2/1984 | Reimert | |
| 4,526,294 A | 7/1985 | Hirschmann et al. | |
| 5,862,958 A * | 1/1999 | Edwards | B01L 3/0206 222/309 |
| 6,135,325 A | 10/2000 | Fessel et al. | |
| 8,142,738 B2 | 3/2012 | Boehm et al. | |
| 8,245,887 B2 | 8/2012 | Ohshima | |
| 8,597,593 B2 | 12/2013 | Boehm et al. | |
| 8,668,117 B2 | 3/2014 | Crossdale et al. | |
| 8,973,847 B2 | 3/2015 | Iammatteo et al. | |
| 9,352,949 B2 | 5/2016 | Rege et al. | |
| 2009/0123226 A1 | 5/2009 | Viegener | |
| 2010/0021349 A1 * | 1/2010 | Boehm | B01L 3/0206 422/400 |
| 2011/0127298 A1 * | 6/2011 | Shah | G01F 11/028 222/309 |
| 2013/0172477 A1 | 7/2013 | Hintzer et al. | |
| 2015/0114997 A1 * | 4/2015 | Uldry | B05B 11/3007 222/309 |
| 2016/0068380 A1 | 3/2016 | Rege et al. | |
| 2016/0214127 A1 * | 7/2016 | Bohm | B05B 11/3007 |
| 2016/0214846 A1 | 7/2016 | Hochholzer et al. | |
| 2016/0214847 A1 * | 7/2016 | Bohm | B67C 3/2634 |
| 2016/0214848 A1 * | 7/2016 | Bohm | B67C 3/007 |
| 2016/0264391 A1 | 9/2016 | Hochholzer et al. | |

FOREIGN PATENT DOCUMENTS

| | | |
|---|---|---|
| DE | 36 07 139 A1 | 9/1987 |
| DE | 198 00 709 A1 | 7/1999 |
| DE | 20 2009 012 054 U1 | 3/2011 |
| EP | 0 542 241 A2 | 5/1993 |
| EP | 1 236 976 A1 | 9/2002 |

* cited by examiner

EXHAUST LINE ASSEMBLY FOR A BOTTLE ATTACHMENT APPARATUS

BACKGROUND OF THE INVENTION

Field of the Invention

The invention relates to an exhaust line assembly for a bottle attachment apparatus for handling liquids, and to a bottle attachment apparatus for handling liquids.

Description of Related Art

In the case of bottle attachment apparatuses for handling liquids, the focus is on precisely measuring and conveying liquids from a storage bottle or another storage container, wherein precise measuring is performed when a partial volume of liquid is received from the storage bottle or similar into the apparatus and/or when a partial volume of liquid is externally dispensed from the apparatus into a container.

Bottle attachment apparatuses of the type being discussed are in particular bottle top dispensers and burets. Bottle attachment apparatuses of this type are widely used in chemical, biological, and pharmaceutical laboratories and production facilities.

The term "liquid" in the present context preferably refers to liquids as are used in chemical, biological, and pharmaceutical laboratories and production facilities etc. These are preferably liquids having a relative viscosity of up to about 300 (viscosity relative to the viscosity of, water, measured at normal conditions). In colloquial terms, the liquids are thus preferably those in the range of very low viscosity to slightly viscous.

In the case of bottle attachment apparatuses of the type being discussed, high requirements are set for volume accuracy of liquid intake and/or liquid dispensation, and for operator safety. The bottle attachment apparatuses are usually operated manually or else are driven by an actuator.

A typical example of a bottle attachment apparatus in the form of a bottle top dispenser is known from European Patent Application EP 0 542 241 A2. The present invention proceeds from this prior art. For bottle attachment apparatuses in the form of bottle top dispensers, the entire content of European Patent Application EP 0 542 241 A2 is incorporated by reference.

In an exemplary manner, a bottle attachment apparatus in the form of a burette is known from European Patent Application EP 2 799 141 A2 and corresponding U.S. Pat. No. 8,142,738 B2. A bottle attachment apparatus in the form of buret has many construction details in common with a bottle attachment apparatus in the form of a bottle top dispenser. Also to this extent, the entire content of EP 2 799 141 A2 and corresponding U.S. Pat. No. 8,142,738 B2 is hereby incorporated by reference.

Here and hereunder, a bottle attachment apparatus is always described in the operating position thereof, that is to say in the position thereof when fastened to a storage bottle or similar, and when aligned in a substantially vertical manner. A valve block assembly for such a bottle attachment apparatus is also described in a corresponding manner, that is to say likewise in the operating position thereof, that is to say when installed in a bottle attachment apparatus in the operating position thereof.

A substantial component part of a bottle attachment apparatus of the type being discussed is the cylinder-and-piston assembly with the aid of which the liquid may be suctioned and exhausted again. Said cylinder-and-piston assembly has a cylinder which defines a longitudinal direction, and a piston which is guided in a sealed manner in the cylinder so as to be longitudinally displaceable. In the event of an upward movement of the piston out of the cylinder, the liquid is suctioned by forming negative pressure in the cylinder. In the event of a downward movement, the liquid in the cylinder is exhausted again from the cylinder. The flow of the liquid during suctioning, on the one hand, and during exhausting, on the other hand, is directed by valves of the valve block assembly. The cylinder-and-piston assembly is connected in a sealing manner to the valve block assembly and to the lines which are located therein. The valve block assembly as such in turn is attached onto the storage bottle or similar with the aid of a fastening assembly.

An intake valve which allows liquid to be suctioned from the storage bottle by means of an intake pipe is located in the valve block of the valve block assembly. The intake pipe, most often in the form of a push-fitted tube, extends deeply downward into the storage bottle. An exhaust line extends away from the valve block in an approximately horizontal manner. An exhaust valve sits in the exhaust line or in the valve block, so as to be at the beginning of the exhaust line. In some instances, the exhaust line has an additional switching valve by way of which a return flow line leading back into the storage bottle may be opened or closed. At the opening from which the liquid exits, the exhaust line may have a closure.

Since the exhaust line protrudes from the valve block in an approximately horizontal manner and the previously discussed switching valve also often sits there, this is that side from which an operator works on the bottle attachment apparatus. This side may be referred to as the "front side" of the bottle attachment apparatus. The opposite side is the "rear side" of the bottle attachment apparatus. In the case of an electronic design embodiment of a bottle attachment apparatus, a display having corresponding operating elements is preferably located on the front side of the bottle attachment apparatus.

The fastening assembly for fastening the external housing and/or the valve block assembly of the bottle attachment apparatus onto a storage bottle or similar is often a thread assembly which is similar to a union nut, or is an internal thread which is incorporated into the valve block per se, for screwing onto the external thread on a bottleneck of the storage bottle (see the prior art mentioned at the outset). However, in principle other fastening assemblies, such as bayonet systems or short-stroke collets are likewise employable, as are systems of the type of a taper-ground joint, which are usual in laboratories.

The present focus is on the exhaust line assembly for a bottle attachment apparatus of the type being discussed. As has been mentioned, this exhaust line assembly is attached to the valve block assembly and/or to the external housing in a replaceable manner, and overall protrudes forwardly. An outrigger-type mount which most often is designed so as to be arcuate, an exhaust line which is disposed and guided in the mount and which terminates in an exhaust tip, and a mounting lug which is most often fastened to the mount and has a closure cap, by way of which the tip of the exhaust line is closable, attached to the end side thereof, so that no further liquid may inadvertently drip from the exhaust tip are part of the exhaust line assembly.

In the prior art from which the present invention proceeds (European Patent Application EP 2 799 141 A2), the mounting lug is a narrow, elongate and readily flexible material strip of a suitable plastics material. This material strip is attached to the mount of the exhaust line assembly such that the former in the case of the closure cap being removed from the tip of the exhaust line hangs down in a substantially vertical manner (having the closure cap attached to the lower end). The closure cap as such is captively fastened to this material strip, but is rotatable about the longitudinal axis thereof in case the closure cap has to be fastened onto the tip of the exhaust line using a rotational movement. To this end the material strip has an eyelet which in an exemplary manner is located in an encircling annular groove in the closure cap. This is the particularly secure design of the tip and of the closure cap which is usual today. If this here is a simple plug connection which is also known per se, the closure cap of course does not have to be rotatably mounted on the mounting lug.

The mounting lug of the exhaust line assembly is normally composed of a plastic which is suitable for the specific application, preferably of a plastics resistant to chemicals. In order for the closure cap in the case of an opened tip to be located outside the region of flow of the liquid flowing from the tip, the mounting lug is fastened to the mount such that the mounting lug automatically folds down when the closure cap is released and hangs down in a substantially vertical manner. In order for the tip to be closed, the closure cap is moved to the top, the mounting lug being deformed in an arcuate manner here.

If and when the closure cap remains on the tip over a prolonged period of time, the mounting lug which is composed of plastics begins to plastically deform to a certain degree. The mounting lug then retains a slightly curved shape even when the closure cap has been removed from the tip of the exhaust line. As opposed to the original intention, the closure cap, on account thereof, moves closer to the region at the lower end of the mounting lug in which the liquid flows from the tip, i.e. the operating region. This interferes with the handling of the bottle attachment apparatus.

If and when the closure cap impacts anywhere in an uncontrolled manner, splashing of potentially toxic or caustic liquid adhering to the closure cap may arise. At least, the closure cap protrudes into the operating region in which the container which receives the dispensed liquid is located and is pushed aside in a yielding and resilient manner. The liquid here may make its way to the external side of the container and consequently also to the handle region of the closure cap. The unwanted result is contamination of the operator's hand and a carryover of the liquid to other objects.

On account of the mounting lug being deformed in a more or less arcuate manner, flexural stress which causes friction in the eyelet-and-groove connection and impedes rotatability of the closure cap at the end of the mounting lug arises in the mounting lug when the closure cap in the closed position sits on the tip. Friction may be so intense that the eyelet is conjointly rotated, the material strip is warped, and rotatability is completely blocked.

Bottle attachment apparatuses of which the tip is disposed so as to be very high on the mount are also to be found in the prior art. The push-fitted closure cap lies above the material strip which is deformed in an arcuate manner. The arc of the material strip then even impedes manual releasing of the closure cap, and the back of the hand may contact the arc during the rotational movement.

SUMMARY OF THE INVENTION

The teaching of the invention is based on the issue of improving an exhaust line assembly of the prior art which is provided with a closable tip, and a bottle attachment apparatus which is equipped with such an exhaust line assembly in terms of operator friendliness in handling.

The present invention relates to an exhaust line assembly for a bottle attachment apparatus for handling liquids, wherein the bottle attachment apparatus has a cylinder-and-piston assembly for suctioning and exhausting liquid, a valve block assembly, optionally an external housing receiving the valve block assembly, a fastening assembly for fastening the external housing and/or the valve block assembly on a storage bottle or the like, and an exhaust line assembly, wherein the exhaust line assembly is attached to the valve block assembly and/or to the external housing and forwardly protrudes from the valve block assembly and/or from the external housing, wherein the exhaust line assembly has an outrigger-type mount, an exhaust line which is disposed and guided in the mount and which terminates in a tip, and a mounting lug which has a closure cap attached to the end side thereof and which is fastened to the exhaust line assembly, the tip of the exhaust line being closable by way of said closure cap, wherein the mounting lug at that end thereof which is fastened to the exhaust line assembly is articulated so as to be pivotable by means of a rotary joint which has a physically present axis of rotation.

The invention proceeds from the concept of implementing handling for closing the tip by moving the closure cap closer in a targeted manner by means of the mounting lug.

To this end, it is provided according to the invention and according to a first teaching that the mounting lug which is preferably composed of plastics is articulated so as to be pivotable at the end thereof which is fastened to the exhaust line assembly by means of a rotary joint.

The rotary joint in the context of the present invention is a joint which in terms of its fundamental construction enables rotational movement of the two components which are connected by means of the rotary joint in relation to one another by arbitrary angles even beyond 360° about a physically present rotation axis. By way of other construction-related specifications, for example by adjacent components, the relative rotational movement which is actually performable by the components may be limited to an angle of less than 360°. Such an angular delimitation may also be configured as an additional constructive measure in the rotary joint as such. In terms of fundamental construction, however, the rotary joint is one that allows said relative rotatability of the two interconnected components about arbitrary angles.

The rotary joint which has the physically present rotation axis in the stated position leads to the mounting lug following the movement of the closure cap performed by an operator from the rest position of said closure cap on the tip to the closure position with practically no resistance. Apart from the minimal influence of the dead weight of the mounting lug, the latter is not subject to any bending stress; consequently, there is also no plastic deformation which would be in any way relevant. The closure cap together with the mounting lug may be moved between the closure position of the former, on the one hand, and the rest position, on the other hand, without any practical resistance. In the rest position, the mounting lug hangs down from the mount of the exhaust line assembly in a substantially vertical manner, following the dead weight of the mounting lug including that of the closure cap. This does not change even in the case of prolonged use of the exhaust line assembly. The closure cap always remains outside the operating region below the tip of the exhaust line.

By way of the realized arrangement of a rotary joint according to the invention, the mounting lug may readily be embodied as a straight elongate material strip from a relatively rigid plastics material. By way of this construction, secure positioning of the closure cap in the rest position is guaranteed in a particularly efficient manner. The material strip forming the mounting lug in the case of a push-fitted closure cap is preferably substantially linear, that is to say not curved, and does not impede manual releasing or push-fitting of the closure cap.

In order to implement a position of the mounting lug which in the closure position of the closure cap is as horizontal as possible, which in turn in the least impedes rotatability of the closure cap at the end of the mounting lug, it is recommended that the rotary joint is disposed on the mount so as to be level with the tip of the exhaust line.

In detail, the rotary joint may be constructed from a combination of bearing journals and bearing eyelets, wherein preferably the bearing journal or the bearing journals are disposed on the exhaust line assembly, while the bearing eyelet or the bearing eyelets are disposed on a yoke-like end of the mounting lug. However, a reversed arrangement is also conceivable. The bearing journal or the bearing journals form the physically present rotation axis of the rotary joint according to the invention.

When the closure cap meets the tip of the exhaust line, the pivoting movement of the mounting lug with the closure cap may lead to the radial spacing from the rotary joint being somewhat different from that in the final closure position of the closure cap on the tip. In order to achieve optimization in the construction and to keep the closure cap on the tip free from interfering forces also under these circumstances, it is recommended that a length compensator is provided between the rotary joint and the closure cap. The effective length of the mounting lug between the rotary joint and the closure cap may thus slightly vary, depending on the position of the mounting lug. This may be implemented, for example, by a limited telescopic design of the material strip forming the mounting lug. However, this may be implemented in a particularly simple and expedient manner on the rotary joint and/or on the closure cap.

According to a preferred teaching, it is now provided that the advantageous length adjustability of the mounting lug is implemented in that the bearing eyelet is configured as a slotted eyelet. If and when the bearing eyelet according to the preferred teaching is disposed on the mounting lug, the slotted eyelet should extend in the direction of the longitudinal axis of the mounting lug.

Fastening of the mounting lug to the mount of the exhaust line assembly is implemented in a particularly expedient manner in that the bearing eyelet is configured so as to be open to one side, having an opening of which the passage dimension is smaller than the diameter of the bearing journal in such a manner that the bearing eyelet, utilizing the inherent elasticity thereof, is push-fittable in a latching manner onto the bearing journal. The openings are dimensioned such that the force which has to be applied for assembly and disassembly is in excess of a multiple of the force of the dead weight of the mounting lug with the closure cap. The mounting lug with the closure cap is therefore securely suspended in the rotary joint; nevertheless, the mounting lug with the closure cap may be assembled and disassembled in an efficient manner. The embodiment of the bearing eyelet or bearing eyelets as a slotted eyelet or slotted eyelets, respectively, guarantees a length tolerance of the mutually interacting components which is expedient in practical use.

In order for the bearing eyelet or bearing eyelets, or in the alternative embodiment the bearing journal or bearing journals, respectively, to be accommodated it may be provided that that end of the mounting lug that is assigned to the rotary joint is configured in a yoke-like or fork-like manner. At the end, the mounting lug is thus no longer the straight elongate material strip, but rather has a shape which is adapted to the functionality in the rotary joint. However, the design may also be chosen such that the mounting lug is provided with an additional connector piece which on its part is designed in a yoke-like or fork-like manner, and in which the at least one bearing eyelet is then located, or on which the at least one bearing journal is then located, respectively.

According to a further teaching of the invention, which is independent as such and which in particular relates to the geometry of the mounting lug, and which is of particular relevance in combination with the afore-described teaching of the invention, the mounting lug between that end thereof that is fastened to the exhaust line assembly, on the one hand, and that end thereof that supports the closure cap, on the other hand, has a spacing which corresponds to the spacing between that end that is fastened to the exhaust line assembly on the one hand and the longitudinal axis of the tip of the exhaust line on the other hand. The spacing on the mounting lug prior to and in the closure position is thus identical. The tip is always hit when the closure cap is being attached. Deformation of the mounting lug for attaching the closure cap to the tip may thus be excluded.

In the afore-described and independent teaching of the invention, the mounting lug is embodied so as to be substantially inherently flexurally rigid. By adapting the length to the predefined spacing, this teaching may also be implemented using another joint than a rotary joint at that end of the mounting lug that is attached to the exhaust line assembly, for example, using a thin integral hinge that produces less bending resistance. A length compensator, if and when nevertheless required, may also be integrated in such a joint.

If the mounting lug of the exhaust line assembly that has been discussed before is articulated to the exhaust line assembly by means of a rotary joint which has a physically present rotation axis, all other embodiments and features of the above-mentioned first embodiment of the invention can be employed as well.

A subject matter of the invention is not only the afore-described exhaust line assembly for a bottle attachment apparatus for handling liquids, but also, and in particular, a bottle attachment apparatus for handling liquids, the exhaust line assembly of which is designed in the manner according to different embodiments of the invention described above.

The invention will be explained in more detail in the following with reference to the accompanying drawings which illustrate a preferred exemplary embodiment.

DETAILED DESCRIPTION OF THE INVENTION

Figure 1:
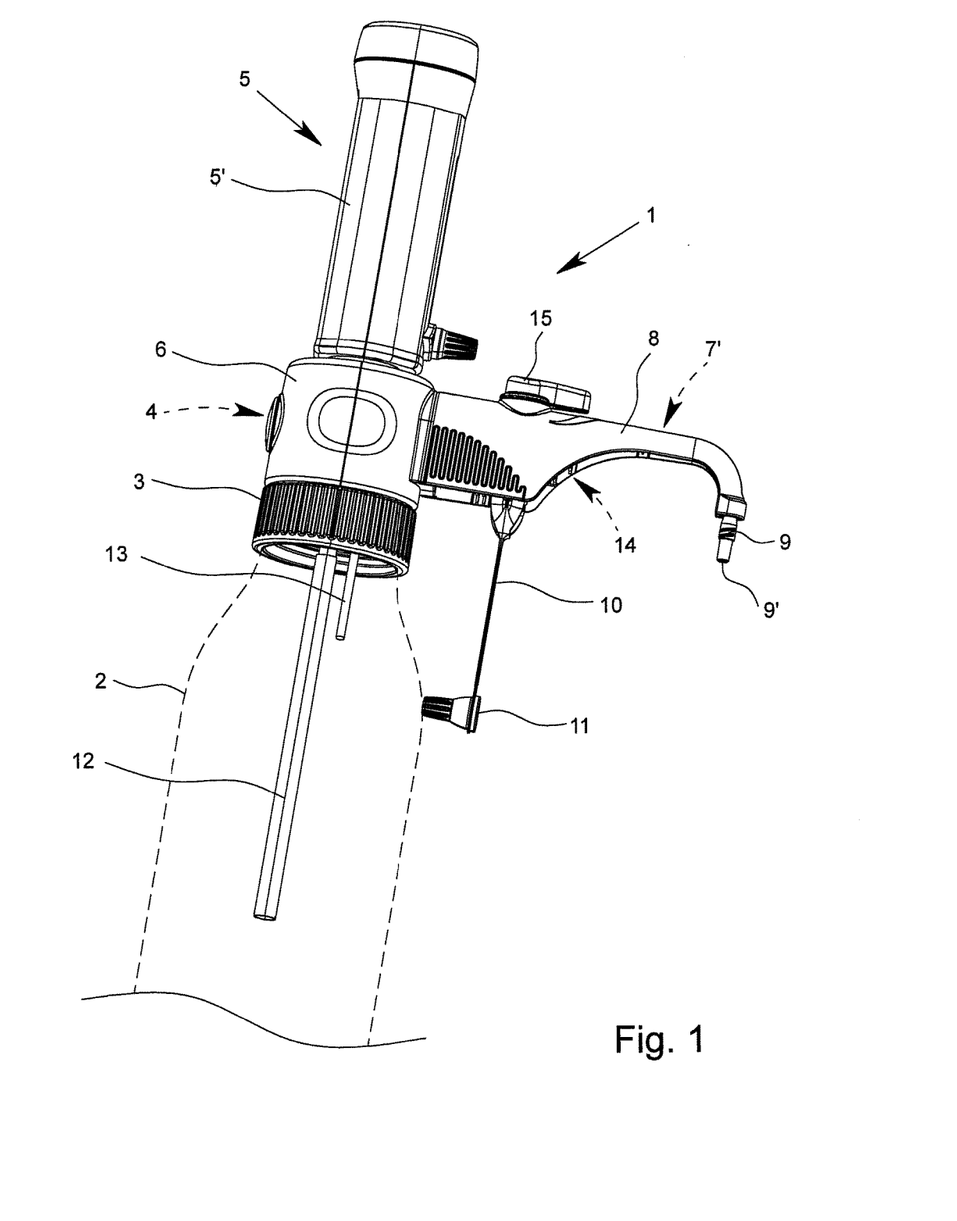
FIG. 1 shows a bottle attachment apparatus for handling liquids, in the form of a bottle top dispenser, in a perspective view.

FIG. 1 shows a preferred exemplary embodiment of a bottle attachment apparatus 1 according to the invention for handling liquids, herein in the form of a bottle top dispenser.

In general terms, in respect of bottle attachment apparatuses for handling liquids, i.e., so-called "liquid handling" apparatuses, reference may be made to the general catalog of the applicant (BRAND general catalog 900 [June 2013]). Bottle attachment apparatus of the type being discussed are comprehensively explained therein in terms of construction and application. Moreover, in respect of bottle attachment apparatuses of the type being discussed, reference may also be made to the sources of the prior art, as stated at the outset.

The definitions pertaining to top and bottom, and to front and rear, which have been stated at the outset of the description, apply to the bottle attachment apparatus which is described here in the preferred exemplary embodiment. The bottle attachment apparatus 1 is always discussed in the position which is illustrated in FIG. 1, so as to be on a storage bottle 2 as a preferred example of a storage container, even when said bottle attachment apparatus is not shown in this position in the individual illustrations.

During operation, the bottle attachment apparatus 1 which is illustrated in FIG. 1 is attached to a storage bottle 2. More specifically, the bottle attachment apparatus 1 with the aid of a fastening assembly 3 is attached to the bottleneck of the storage bottle 2. If the bottleneck of the storage bottle 2 has an external thread, the fastening assembly 3 may be, for example, a type of annular cap having an internal thread, said annular cap being attached at the bottom of the bottle attachment apparatus 1. However, the fastening assembly 3 may also be configured in the form of a stopper-like plug assembly, or assume other shapes. It is only essential that the bottle attachment apparatus 1 by means of the fastening assembly 3 may be securely fastened to the storage bottle 2 or to any other matching storage container.

The cylinder-and-piston assembly 5 of the bottle attachment apparatus 1 can be seen at the top of FIG. 1. The bottle attachment apparatus 1 presently has a cylinder-and-piston assembly 5 having an external cylinder housing 5' which encompasses the cylinder. A mechanical and adjustable stop for the length of the stroke is located on said cylinder housing 5'.

A valve block assembly 4 supports the cylinder-and-piston assembly 5, but the former as such according to the preferred teaching here is located in an external housing 6 of the bottle attachment apparatus 1, that is to say that said valve block assembly 4 is not directly identifiable in FIG. 1. The fastening assembly 3 as such is located on the valve block assembly 4 or, as is the case here, on the external housing 6.

An exhaust line 7 forwardly protrudes from the external housing 6 of the bottle attachment apparatus 1, said exhaust line 7 in the illustrated exemplary embodiment being disposed and guided in a outrigger-type mount 8 which is of angular design. The exhaust line 7 terminates at a tip 9. A mounting lug 10 which holds a closure cap 11, by way of which the tip 9 of the exhaust line 7 may be closed off and protected against dripping liquid, is fastened to the mount 8.

An intake line 12 for liquid extends downward from the valve block assembly 4, which is hidden in the external housing 6, into the storage bottle 2. Besides the intake line 12, a return flow line 13 through which liquid may be directed back into the storage bottle 2 instead of through the exhaust line 7, if required, can be seen.

A switching valve 14 which is suitable for returning the flow of liquid into the storage bottle 2 and which is actuatable by means of a toggle 15 on the upper side of the mount 8, here is located outside the valve block assembly 4 and outside the external housing 6, and in the preferred exemplary embodiment illustrated is part the mount 8 for the exhaust line 7.

Figure 2:
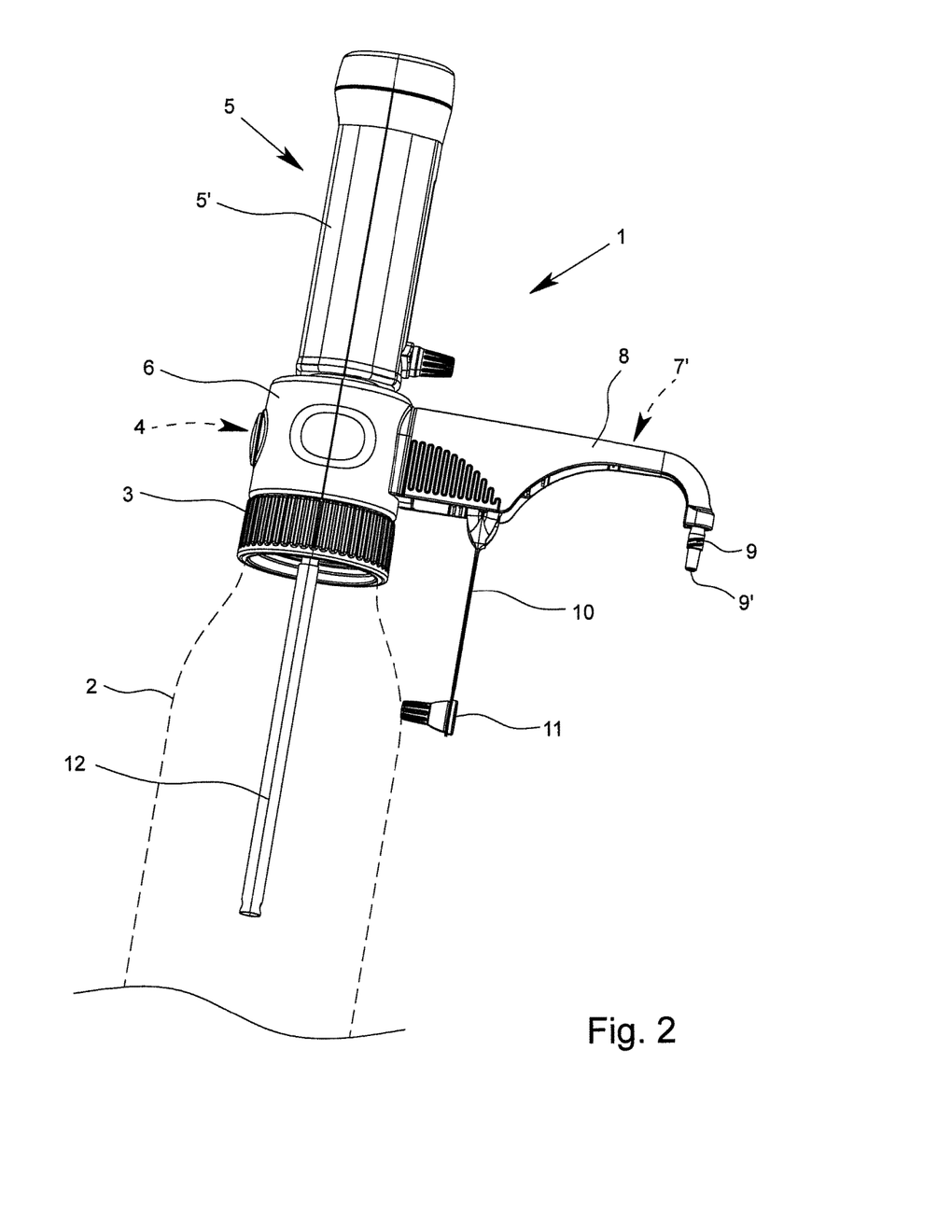
FIG. 2 shows a bottle attachment apparatus in an illustration corresponding to that of FIG. 1, without a switching valve.

There are also bottle attachment apparatuses 1 in the form of a bottle top dispensers without a switching valve 14, that is to say without the "return dosing" function, which is explained in detail in the prior art (European Patent Application EP 0 542 241 A2). In this case, the return flow line 13 is of course also missing (see FIG. 2).

FIG. 1 shows the bottle attachment apparatus 1 having the switching valve 14 as part of the mount 8, and having the mounting lug 10 together with the closure cap 11 in the rest position, that is to say hanging down from the exhaust line assembly 7'.

Figure 3:
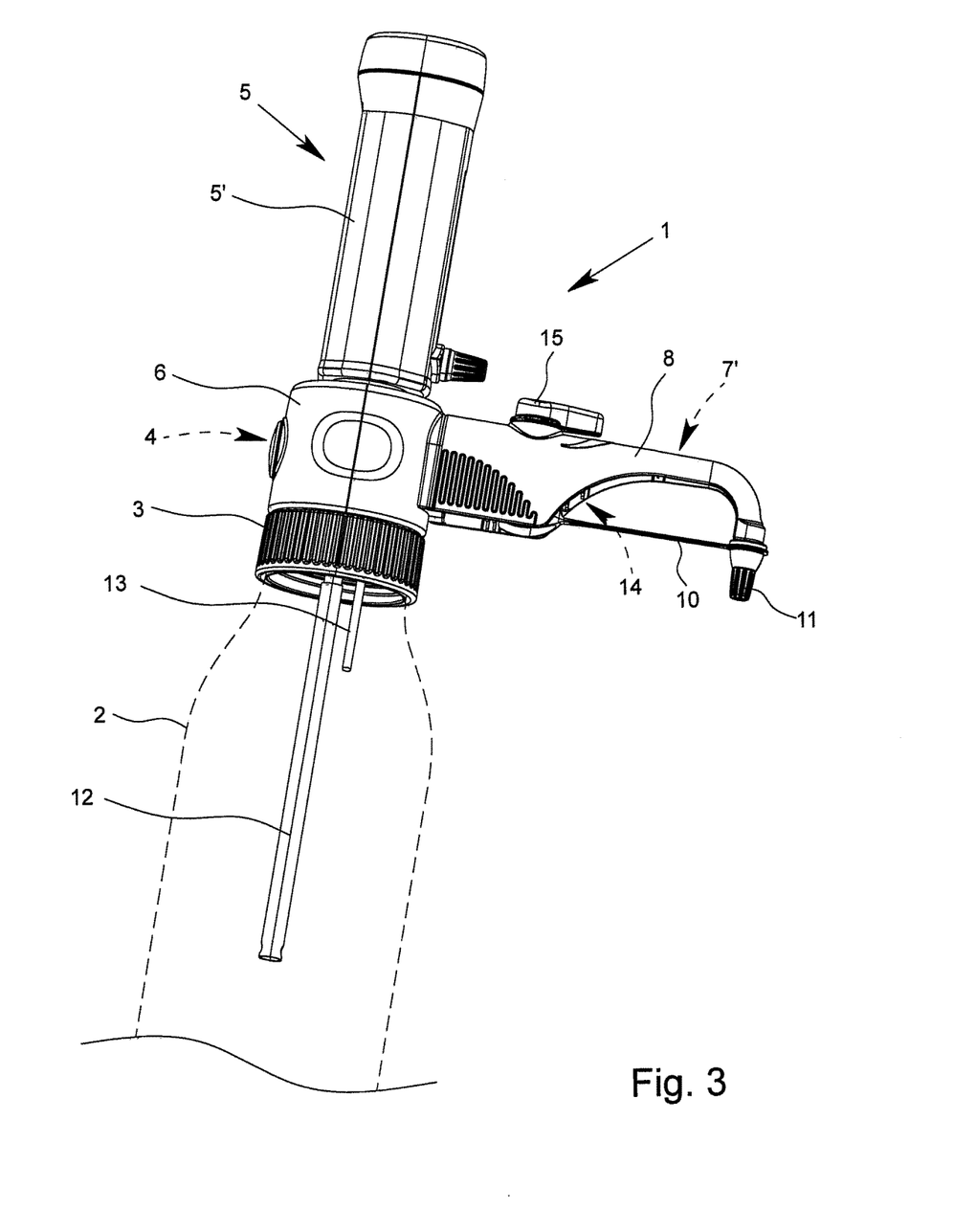
FIG. 3 shows the bottle attachment apparatus from FIG. 1, having a closure cap and a mounting lug, in the closure position.

FIG. 3 shows the same assembly as in FIG. 1, however the closure cap 11 is now sitting on the tip 9 of the exhaust line 7 and closing the latter off, such that the mounting lug 10 extends in a substantially horizontal manner from the switching valve 14 of the mount 8 to the closure cap 11.

Figure 4:
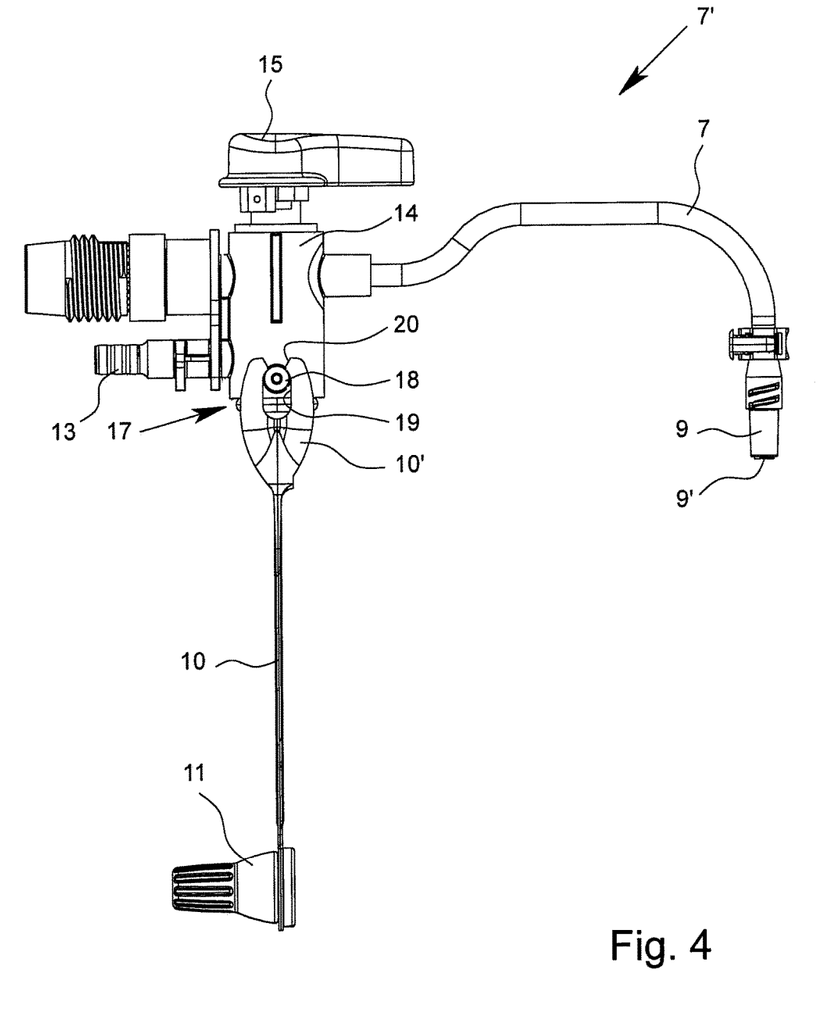
FIG. 4 shows in a partial and enlarged illustration the exhaust line assembly of the bottle attachment apparatus from FIG. 1.

FIG. 4 shows the exhaust line assembly 7' from FIG. 1, however a cover belonging to the mount 8 being now removed. On account thereof, the interior of the exhaust line assembly 7' can be seen. It can be seen that the mounting lug 10 is suspended from the housing of the switching valve 14. If and when the mount 8 has no switching valve 14, the mounting lug 10 may be suspended from another point of the exhaust line assembly 7', for example from the cover (as in FIG. 2).

Typically, and also provided here, the closure cap 11 is fastened to the mounting lug 10 in a captive manner but is rotatable about the longitudinal axis thereof. In the illustrated exemplary embodiment this is implemented in that an annular eyelet which is rotatably guided in an annular groove of the closure cap 11 and is axially delimited by the groove walls is located here on the mounting lug 10.

Figure 5:
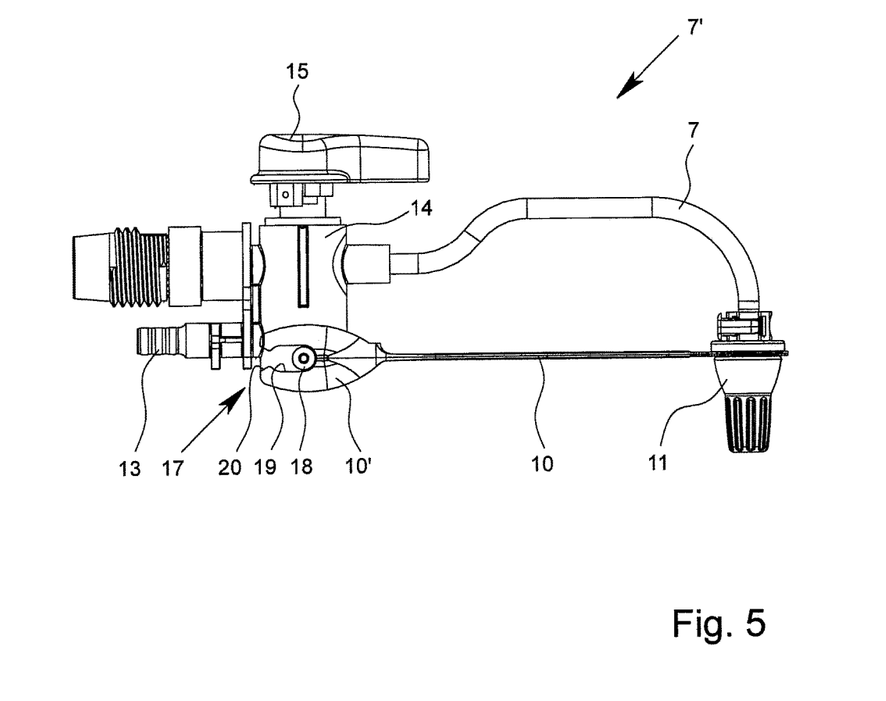
FIG. 5 shows in a partial and enlarged illustration the exhaust line assembly of the bottle attachment apparatus from FIGS. 3.
Figure 6:
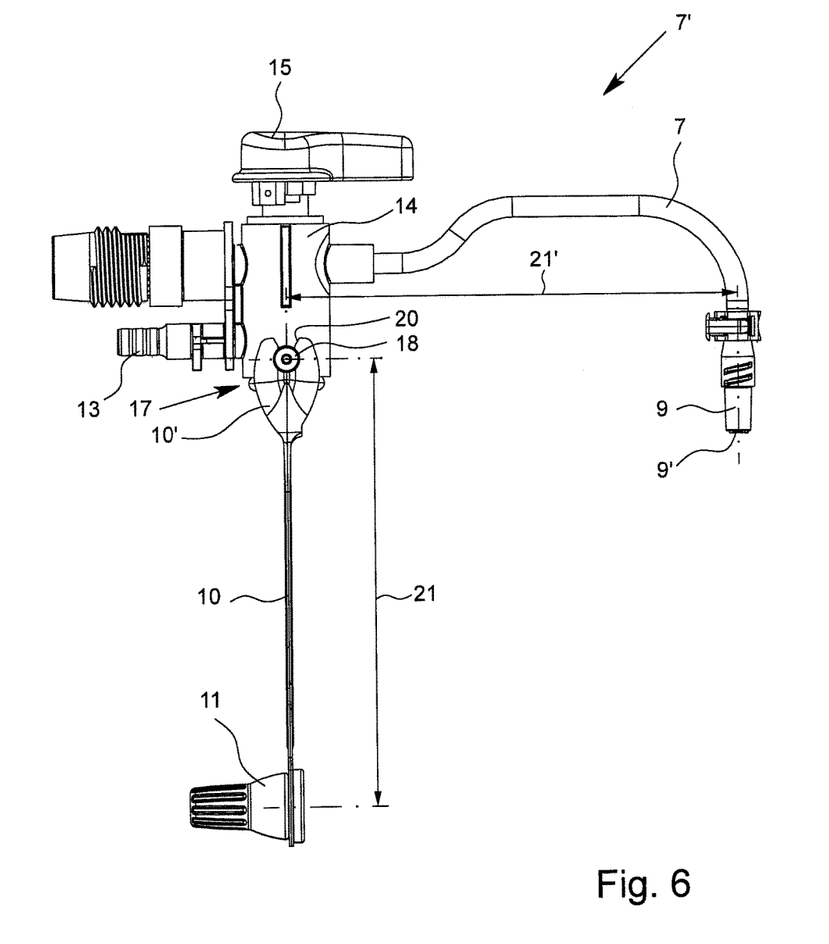
FIG. 6 is a view like that of FIG. 4, but with the spacing distances identified.

FIGS. 4 and 5 now show the core concept of the invention very well, namely that the mounting lug 10 at that end thereof that is fastened to the exhaust line assembly 7' by means of a rotary joint 17 is pivotably articulated. This here is a rotary joint 17 which has a physically present rotation axis 18, not a joint which in one form or another is based on material deformation, for example in a manner similar to an integral hinge. By way of the rotary joint 17 the mounting lug 10 obtains pivotability about the rotation axis 18 which is practically without resistance. Functioning of such a rotary joint 17 has been explained in detail in the general part of the description. Reference may be made here to these explanations.

The rotation axis 18 runs parallel with the front side of the bottle attachment apparatus 1 and transversely to the longitudinal axis of the closure cap 11. On account thereof, the pivoting movement of the mounting lug 10 is performed so as to be guided in a plane which is perpendicular to the front side of the bottle attachment apparatus 1 and transverse to the longitudinal axis of the closure cap 11.

It is preferably provided that the mounting lug 10 is embodied as a substantially straight elongate material strip. As has already been communicated, the mounting lug 10 is preferably formed of a suitable plastic. The arrangement of the mounting lug 10 on a rotary joint 17 now offers the possibility that, if and when desired, the mounting lug 10 may be embodied so as to be inherently relatively rigid and significantly more rigid than the mounting lugs in the prior art known to date. Said mounting lug 10 then assumes a constant loadable relative position in relation to the closure cap 11, having a positive effect in particular in the closure position with a mounting lug 10 which is aligned in a substantially horizontal and linear manner.

In order to make for a substantially horizontal alignment of the mounting lug 10 in the closure position of the closure cap 11 in practice, it is recommended that the rotary joint 17 is disposed on the exhaust line assembly 7' so as to be level with the tip 9 of the exhaust line 7. This has also been implemented in this way in the illustrated exemplary embodiment. The mounting lug 10 is located above the handle region on the closure cap 11, and releasing/untwisting of the latter is not interfered with.

In terms of the design of the rotary joint 17, the illustrated exemplary embodiment which to this extent is preferable shows that the rotary joint 17 has two bearing journals 18, which are disposed on the exhaust line assembly 7' and form the rotation axis 18, and each bearing journal 18 has one bearing eyelet 19 which is disposed on the mounting lug 10 and encompasses the bearing journal 18. On account of this embodiment, it is possible for the mounting lug 10 to be pivoted in a guided manner in a plane in the direction of the exhaust line assembly 7'. When the hanging closure cap 11 is manually attached, or is lifted; respectively, the former is guided straight toward the tip 9 and precisely hits the latter.

In the present exemplary embodiment, it is provided here that in FIG. 4 in each case one bearing journal 18 is disposed at the front and the rear on the housing of the switching valve 14, and that each of the bearing journals 18 is assigned one bearing eyelet 19 at an end-side shoulder of a fork-like connector piece 10' of the mounting lug 10. The bearing journals 18, which here are disposed in an outwardly protruding manner on the housing of the switching valve 14, in the case of a push-fitted cover of the mount 8 bear on the internal wall of the cover. On account thereof, it is ensured that the mounting lug 10 by way of the bearing eyelets 19 thereof in the connector piece 17' cannot laterally slip off the bearing journals 18. A guide for the bearing eyelets 19 of the rotary joint 17 may also be present toward the inside, i.e., toward the housing of the switching valve 14.

In principle, it is possible for the bearing eyelets 19 of the connector piece 10' to be latched from the outside onto the bearing journals 18, utilizing the inherent elasticity of the plastic material. The illustrated and preferred exemplary embodiment, in this respect, shows a more expedient solution which allows assembly and disassembly in particular even while the cover of the mount 8 is push-fitted. To this end, it is specifically provided that the bearing eyelet 19 is configured so as to be open to one side, having an opening 20 of which the passage dimension is smaller than the diameter of the bearing journal 18 in such a manner that the bearing eyelet 19, utilizing the inherent elasticity thereof, is push-fittable in a latching manner onto the bearing journal 18. This is very well visible in FIGS. 4 and 5.

It becomes evident in FIG. 5 that it is expedient for a length compensator to be provided between the rotary joint 17 and the closure cap 11, not only for compensating the given trigonometrical deviation of the rotary mount, but also for compensating tolerances. In the illustrated exemplary embodiment, this is enabled by way of a length compensator on the fastening portion on the rotary joint 17. Additionally or alternatively, it would also be possible for the fastening portion on the closure cap 11 to be embodied with a length compensator. Here too, reference has been made in the general part of the description to other potential embodiments of the length compensator, for example to a telescopic embodiment of the mounting lug 10.

Furthermore, it can be seen in FIGS. 4 and 5 that the bearing eyelet 19, in the illustrated exemplary embodiment the two bearing eyelets 19 which are located so as to be mutually opposite, is configured as a slotted eyelet. On account of the embodiment of the bearing eyelet 19 as a slotted eyelet, are movement path of the bearing eyelet 19 in relation to the bearing journal 18 in the direction of the longitudinal axis of the slotted eyelet results. In practical terms, this is a length compensator. The length compensator enables attaching and removing of the closure cap 11 to the tip 9 in a manner that is particularly easy, rapid, and without resistance (see, FIG. 5 in comparison with FIG. 4).

The afore-described exemplary embodiment is not to be understood as being limiting. Alternatives thereto in various terms have already been discussed. In this way, the bearing journals 18 may also be disposed on the mounting lug 10, whereas the bearing eyelets 19 then would be disposed on the mount 8. The connector piece 10' which here is embodied in a fork-like manner and is attached to the mounting lug 10, may also be part of the mounting lug 10. In this case the end of the mounting lug 10 would simply be configured in a yoke-like or fork-like manner and would support the bearing eyelet 19 or the bearing eyelets 19, respectively, or in the alternative design would support the bearing journal 18 or the bearing journals 18, respectively.

As opposed to the mounting lugs of the prior art, which compensate for the spacing from the suspension thereof from the tip by way of their own flexibility, this is largely provided by the geometry of the mounting lug 10 according to the invention. In the embodiment according to the invention, the mounting lug 10 at that end thereof that is fastened to the exhaust line assembly 7', has the rotary joint 17, and at that end thereof that supports the closure cap 11 has the annular eyelet. The spacing 21 on the mounting lug 10 between the closure cap 11 and the fastened end corresponds to the spacing 21' from this end to the longitudinal axis of the tip 9 on the exhaust line 7. The spacing on the mounting lug 10 in the closure position and in the position in which the closure cap 11 is removed and hangs down is thus identical. The spacing here is preferably measured in a horizontal manner, as is illustrated in FIG. 5. During attachment of the closure cap 11 the mounting lug 10 has neither to be pulled nor bent in order for the tip 9 to be hit.

In terms of the material and the cross section, the mounting lug 10 may be designed so as to be substantially flexurally rigid. Said mounting lug 10 may additionally also have reinforcement elements, such as a corrugation, for example.

The last-described embodiment in which the spacing on the mounting lug 10 between the closure cap 11 and the fastened end of the mounting lug 10 corresponds to the spacing from this end to the longitudinal axis of the tip 9 on the exhaust line 7 may also be implemented without a rotary joint 17. For example, an integral hinge which may be readily bent may be employed instead of the rotary joint 17. A significant advantage in relation to the mounting lugs 10 which are used in the prior art is already achieved by way of this construction.

It is derived from the entire illustration in the above explanations that the teaching of the invention relates not only to an exhaust line block assembly 7' for a bottle attachment apparatus 1 as a replacement part, but that the teaching of the invention very particularly also relates to a bottle attachment apparatus 1 in which an exhaust line assembly 7' according to the invention is employed. To this extent, reference may be made to the preceding explanations.

This description uses examples to disclose the invention including the best mode enabling any person skilled in the art to make and use the invention. The patentable scope of the invention, however, is defined by the claims, and may include other examples that occur to those skilled in the art. Such other examples are intended to be within the scope of the claims if they have structural elements that do not differ from the literal language of the claims, or if they include structural elements equivalent to the structural elements covered by the literal language of the claims.

What is claimed is:

1. An exhaust line assembly for a bottle attachment apparatus for handling liquids, comprising:
   a cylinder-and-piston assembly for suctioning and exhausting liquid,
   a valve block assembly,
   a fastening assembly for fastening the valve block assembly on a storage bottle, and
   an exhaust line assembly,
   wherein the exhaust line assembly is attached to the valve block assembly and forwardly protrudes from the valve block assembly,
   wherein the exhaust line assembly has an outrigger mount, an exhaust line which is disposed and guided in the mount and which terminates in a tip, and a mounting lug which has a closure cap attached to the end thereof and which is fastened to the exhaust line assembly, the tip of the exhaust line being closable by way of said closure cap, and
   wherein the mounting lug at an end thereof which is fastened to the exhaust line assembly is articulated so as to be pivotable by means of a rotary joint which has a physically present axis of rotation.

2. The exhaust line assembly as claimed in claim 1, wherein the mounting lug is made of plastic.

3. The exhaust line assembly as claimed in claim 1, wherein the closure cap is fastened to the mounting lug in a captive manner, but is rotatable about a longitudinal axis thereof.

4. The exhaust line assembly as claimed in claim 1, wherein the mounting lug is formed of a substantially straight elongated material strip.

5. The exhaust line assembly as claimed in claim 4, wherein, in a position of the mounting lug when the closure cap thereof is closing the tip of the exhaust line, the material strip which forms the mounting lug is disposed in a substantially straight manner.

6. The exhaust line assembly as claimed in claim 1, wherein the rotary joint is disposed on the mount so as to be level with the tip of the exhaust line.

7. The exhaust line assembly as claimed in claim 1, wherein the rotary joint has at least one bearing journal disposed on the exhaust line assembly and forming the axis of rotation, wherein the bearing journal has at least one bearing eyelet which is disposed on the mounting lug and encompasses the bearing journal.

8. The exhaust line assembly as claimed in claim 7, wherein the at least one bearing eyelet is configured as a slotted eyelet and acts as a length compensator between the rotary joint and the closure cap.

9. The exhaust line assembly as claimed in claim 7, wherein the at least one bearing eyelet is configured so as to be open to one side, having an opening having a passage dimension smaller than the diameter of the bearing journal in such a manner that the bearing eyelet, utilizing the inherent elasticity thereof, is push-fittable in a latching manner onto the bearing journal.

10. The exhaust line assembly as claimed in claim 7, wherein an end of the mounting lug that is assigned to the rotary joint is configured in a yoke-shaped or fork-shaped manner, or is provided with a yoke-shaped or fork-shaped connector piece in which the at least one bearing eyelet or at least one bearing journal is located.

11. The exhaust line assembly as claimed in claim 1, wherein the rotary joint has at least one bearing journal disposed on the mounting lug and forming the rotation axis, and the bearing journal has at least one bearing eyelet which is disposed on the exhaust line assembly and encompasses the bearing journal.

12. The exhaust line assembly as claimed in claim 1, wherein a length compensator is provided between the rotary joint and the closure cap.

13. An exhaust line assembly for a bottle attachment apparatus for handling liquids, comprising:
   a cylinder-and-piston assembly for suctioning and exhausting liquid,
   a valve block assembly,
   a fastening assembly for fastening the valve block assembly on a storage bottle, and
   an exhaust line assembly,
   wherein the exhaust line assembly is attached to the valve block assembly and forwardly protrudes from the valve block assembly,
   wherein the exhaust line assembly has an outrigger mount, an exhaust line which is disposed and guided in the outrigger mount and which terminates in a tip, and a mounting lug which has a closure cap attached to one end thereof and is fastened to the exhaust line assembly at an opposite end thereof by a rotary joint, the tip of the exhaust line being closable by way of said closure cap, and
   wherein the mounting lug has a length between a pivot axis of the rotary joint to which the end of the mounting lug is fastened to the exhaust line assembly and a centerline of the closure cap which corresponds to a distance between the pivot axis of the rotary joint and a longitudinal axis of the tip of the exhaust line at the tip thereof, such that the cap is able to seat on the tip simply by rotating of the lug about said pivot axis.

14. The exhaust line assembly as claimed in claim 13, wherein the mounting lug is made of plastic.

15. The exhaust line assembly as claimed in claim 13, wherein the closure cap is fastened to the mounting lug in a captive manner, but is rotatable about the longitudinal axis thereof.

16. The exhaust line assembly as claimed in claim 13, wherein, in a position of the mounting lug in which the closure cap is closing the tip of the exhaust line, a material strip which forms the mounting lug is disposed in a substantially straight manner.

17. The exhaust line assembly as claimed in claim 13, wherein the rotary joint is disposed on the mount so as to be level with the tip of the exhaust line.

18. The exhaust line assembly as claimed in claim 13, wherein the rotary joint has at least one bearing journal disposed on the exhaust line assembly and forming the axis of rotation, and wherein the bearing journal has at least one bearing eyelet which is disposed on the mounting lug and encompasses the bearing journal.

19. The exhaust line assembly as claimed in claim 13, wherein the rotary joint has at least one bearing journal disposed on the mounting lug and forming the rotation axis, and wherein the bearing journal has at least one bearing eyelet which is disposed on the exhaust line assembly and encompasses the bearing journal.

20. The exhaust line assembly as claimed in claim 19, wherein the at least one bearing eyelet is configured as a slotted eyelet and acts as a length compensator between the rotary joint and the closure cap.

21. The exhaust line assembly as claimed in claim 19, wherein the at least one bearing eyelet is configured so as to be open to one side, having an opening with a passage dimension that is smaller than the diameter of the bearing journal in such a manner that the bearing eyelet, utilizing the inherent elasticity thereof, is push-fittable in a latching manner onto the bearing journal.

22. The exhaust line assembly as claimed in claim 13, wherein a length compensator is provided between the rotary joint and the closure cap.

23. A bottle attachment apparatus for handling liquids, comprising:
- a cylinder-and-piston assembly for suctioning and exhausting liquid,
- a valve block assembly,
- a fastening assembly for fastening the valve block assembly on a storage bottle, and
- an exhaust line assembly,
- wherein the exhaust line assembly is attached to the valve block assembly and forwardly protrudes from the valve block assembly,
- wherein the exhaust line assembly has an outrigger mount, an exhaust line which is disposed and guided in the mount and which terminates in a tip, and a mounting lug which has a closure cap attached to the end thereof and which is fastened to the exhaust line assembly, the tip of the exhaust line being closable by way of said closure cap, and
- wherein the mounting lug at an end thereof which is fastened to the exhaust line assembly is articulated so as to be pivotable by means of a rotary joint which has a physically present rotation axis.

24. The bottle attachment apparatus as claimed in claim 23, wherein the mounting lug is made of plastic.

25. The bottle attachment apparatus as claimed in claim 23, wherein the closure cap is fastened to the mounting lug in a captive manner, but is rotatable about the longitudinal axis thereof.

26. The bottle attachment apparatus as claimed in claim 23, wherein the mounting lug is a substantially straight elongate material strip.

27. The bottle attachment apparatus as claimed in claim 26, wherein, in a position of the mounting lug in which the closure cap thereof is closing the tip of the exhaust line, the material strip which forms the mounting lug is disposed in a substantially straight manner.

28. The bottle attachment apparatus as claimed in claim 23, wherein the rotary joint is disposed on the mount so as to be level with the tip of the exhaust line.

29. The bottle attachment apparatus as claimed in claim 23, wherein a length compensator is provided between the rotary joint and the closure cap.

* * * * *